United States Patent Office 3,094,527
Patented June 18, 1963

3,094,527
PROCESS FOR THE EXTRACTION OF CEPHALOSPORIN FROM AN IMPURE SOLUTION THEREOF
Howard Walter Florey, Edward Penley Abraham, Guy Geoffrey Frederick Newton, and Henry Stowar Burton, % Sir William Dunn School of Pathology, University of Oxford, Oxford, England, and Brendan Kevin Kelly, Clifford William Hale, and George Arthur Miller, % Antibiotics Research Station, 4 Elton Road, Clevedon, England
No Drawing. Original application Dec. 7, 1953, Ser. No. 396,742, now Patent No. 2,883,328, dated Apr. 21, 1959. Divided and this application July 11, 1958, Ser. No. 751,588
14 Claims. (Cl. 260—243)

It has been shown (see Crawford, Heatley, Boyd, Hale, Kelly, Miller and Smith—The Journal of General Microbiology, 6, 47–59) that a material having antibiotic properties is produced when a certain species of Cephalosporium which is or which resembles C. acremonium is grown upon a nutrient medium containing a carbohydrate (e.g. glucose, lactose or starch) and a source of organic nitrogen, such as corn steep liquor in the presence of molecular oxygen. The material comprises a mixture of individual antibiotic substances of which at least one is active predominantly against many gram positive bacteria and of which at least one other exhibits activity of the same order against gram negative and gram positive bacteria. On fractionation the material yields inter alia a penicillinase-sensitive fraction, which is active against many gram negative and gram positive bacteria.

It has also been shown that, of several hundred strains tested, one particular strain of this species, which has since been deposited at the Commonwealth Mycological Institute, Ferry Lane, Kew, Surrey, England where it has been indexed Cephalosporium I.M.I. 49137 (and has also been deposited with the American Type Culture Collection, Washington, D.C., where it has been indexed as ATCC No. 11550) produces a titre of antibiotic substances which is about six times greater than that produced by the remainder.

Copending application, Serial No. 396,742, filed December 7, 1953, now Patent No. 2,883,328, of which the present application is a division, discloses that by using a nutrient medium containing sucrose and/or lactose and ammonium acetate, the antibiotic material produced contains a greatly increased proportion of a penicillinase-sensitive substance or substances active against both gram negative and gram positive organisms.

Accordingly the invention to which said copending application is directed provides a process for the production of a penicillinase-sensitive antibiotic material active against both gram negative and gram positive bacteria which comprises fermenting a nutrient medium containing sucrose and/or lactose, ammonium acetate and a source of organic nitrogen with a mould of the species of which Cephalosporium I.M.I. 49137 is a member in the presence of molecular oxygen and separating the mould and the antibiotic material thereby produced.

According to the present invention, it has further been found that a penicillinase-sensitive antibiotic substance active against many gram negative and gram positive bacteria and obtainable by the fermentation process of this invention is readily extractable from impure solutions thereof by a process involving adsorption in turn upon charcoal and upon alumina. Accordingly, the present invention provides a process for the extraction of a penicillinase-sensitive antibiotic substance active against gram negative and gram positive bacteria obtainable by fermentation of a nutrient medium containing sucrose and/or lactose, a source of organic nitrogen and ammonium acetate with Cephalosporium I.M.I. 49137 from an impure solution of said antibiotic substance which comprises contacting said impure solution with charcoal, under mildly acid conditions, eluting adsorbed antibiotic substance from the charcoal, contacting the eluate with a column of alumina and eluting adsorbed antibiotic substance from the column.

For convenience, the penicillinase-sensitive antibiotic substance active against many gram negative and gram positive bacteria will hereinafter be referred to as "Cephalosporin N."

When extracting the Cephalosporin N from an impure solution thereof, for example a liquid medium remaining after the fermentation with or without preliminary purification, we prefer to contact the impure solution with active charcoal at a pH of from 6 to 6.5 and then elute adsorbed material from the charcoal using strong aqueous acetone (e.g. 60% acetone). The active charcoal so employed is normally treated with a phosphate buffer solution of pH 6 to 6.5 before use in order to avoid undesired changes of pH during the process of adsorption.

Instead of eluting with aqueous acetone we may wet the charcoal with a charcoal adsorbable solvent which is immiscible or only partially miscible with water, thereby displacing the wanted fraction which may be washed from the wetted charcoal with water saturated with the solvent. We then pass the eluate from the charcoal through a column of alumina, best results being obtained at temperatures of from 0° C. to 10° C. and with the alumina equilibriated to a pH of from 4.2 to 6.5 for example by suspending it in water and adding just sufficient alkali or acid to bring the pH of the suspension, as measured by the glass electrode to the value required. Preferably no more alumina is used than can be substantially saturated by the eluate to be treated. The required amount of alumina may be estimated using a small pilot column. After saturation, the alumina may be eluted with very dilute (e.g. 0.01 N) aqueous alkali or with weak aqueous acetone (e.g. 20% acetone) being, if desired, first washed with strong aqeous acetone (e.g. 70% acetone). The eluate from the alumina may be treated to separate the Cephalosporin N in a dry form (preferably after one or more further treatments with alumina) for example by freeze drying or by precipitating with acetone.

If desired, the acetone used in the elution of the adsorbed material from the charcoal and/or from the alumina, may be replaced by a lower water-miscible alcohol, for example methanol, ethanol or one of the propanols, or by methyl acetate.

We have found that it is possible to effect further purification by admixing the active material with sodium or potassium citrate (e.g. about 0.1 molar) strong aqueous ammonium sulphate (e.g. about 46% w./v.), aqueous ethanol (e.g. about 35% v./v.) and sufficient phosphoric acid to render the mixture slightly acid (e.g. about pH 6). The resulting mixture separates into two phases of, usually, approximately equal volume, in which the active material may be subjected to counter-current distribution.

We have also found that Cephalosporin N, being ionised in aqueous solution to yield an active anion, is adsorbed by anion exchange resins. Accordingly the present invention also provides a process for the separation of Cephalosporin N from an impure solution thereof, preferably after a preliminary purification by one or more of the processes described herein, which process comprises contacting the solution with an anion exchange resin and eluting said resin with a dilute acid. For best results this process should be carried out chromatographically, in a column, at from 0 to 4° C.

We have also found that the antibiotic substance can be extracted from aqueous solutions thereof (preferably cold aqueous solutions, e.g. at from 3° C. to 12° C., preferably at about 4° C.) into saturated aqueous solutions of phenol or of its homologues such as the cresols. Accordingly the present invention also provides a process for the separation of Cephalosporin N from an impure aqueous solution thereof, preferably after preliminary treatment by adsorption in turn upon charcoal and alumina as described herein, which process comprises extracting said solution with a saturated aqueous solution of phenol or of a homologue thereof. The Cephalosporin N in the impure solution may be in the form of a salt thereof, e.g. the barium salt.

The partition coefficient between the water of the aqueous solution and the saturated aqueous phenol, is we find, dependent upon the pH of the aqueous solution, the active material tending to concentrate in the water at a pH of above 4.5 and tending to concentrate in the saturated aqueous phenol at from pH 2.5 to pH 3.5. It is therefore a simple matter to extract into the saturated aqueous phenol by adjusting the pH of the aqueous solution to from pH 2.5 to pH 3.5 and later to recover the active material from the saturated aqueous phenol by extracting with water whose pH has been adjusted appropriately, for example to pH 5.0.

Any phenol entering the water may be removed by extraction with an organic solvent for phenol, two extractions with an equal volume of benzene usually being sufficient. The impure solution subjected to this phenol-partition process may be a crude broth obtained by fermentation or may be a solution which has been partially purified by a process as described herein.

The amount of active material absorbed by the saturated aqueous phenol may be increased by the addition to the system of a small amount, for example from 1% to 10% of an organic tertiary base for example dimethylaniline, pyridine, a lutidine or a collidine. In the presence of these bases (which may be called carriers) the optimum pH for absorption by the saturated aqueous phenol will differ from that indicated above, being about pH 4.0 for a weak base such as dimethylaniline and pH 5.5 for a stronger base such as sym-collidine. The optimum pH for a particular tertiary base may be determined by experiment. Not only does the addition of a tertiary base increase the partition coefficient for the system by as much as five or ten times, but by suitably choosing the base, the optimum pH may be moved to a value at which the active material has maximum stability.

When an organic tertiary base has been used the active material may be recovered in aqueous solution by adding alkali to suppress the ionisation of the base and then removing the phenol and the carrier base by extraction with a suitable solvent, for example benzene. To ensure complete extraction of the phenol and the carrier a second extraction with the solvent is usually desirable.

As experiments have shown that the antibiotic substance may be unstable in the presence of copper, tin, lead or mercury, even in traces thereof, we prefer to free, by distillation or otherwise, the water and the other solvents (e.g. acetone and alcohols) from traces of these metals before use.

It will be appreciated the references herein to Cephalosporin N are not to be taken as implying that this material is necessarily pure in the sense that it contains only one species of molecule.

The invention will be further understood from the following specific examples, which it is to be understood, are not intended to limit the scope of the invention. The units of activity quoted in these examples are arbitrary units. Unless otherwise indicated the proportions quoted are proportions by weight.

*Example 1*

Into a 100 gallon stainless steel fermenter were placed 6.4 litres of corn steep liquor containing a total of 256 g. of organic nitrogen, 6.4 kg. of sucrose, and 1.408 kg. of ammonium acetate. The whole was made up to 320 litres with water and 108 ml. of triamyl citrate and 30 ml. of chloroform containing 6 g. of an antifoam agent known to the trade as Dow Corning Silicone A.

The medium and vessel were sterilized with steam at 15 lbs./sq. in. for 20 minutes, cooled to 30° C. and inoculated with 8 litres of a 72 hour culture of Cephalosporium I.M.I. 49137 grown in a glass vessel containing the same medium.

Fermentation was carried out at from 28 to 30° C. with a stirring speed of 400 r.p.m. while air was passed through the medium at 15 cu. ft./min.

After 48 hours, the broth was cooled to below 20° C. and filtered to remove mycelium and spores. The clear broth was adjusted to pH 5.7 with hydrochloric acid and 300 litres thereof were flowed down a column packed with 30 litres of granular carbon, previously buffered with sodium phosphate solution at pH 6.0 and well washed with water, at a rate of about 2 litres/min.

After adsorption, aqueous acetone (60% v./v. acetone) was flowed down and collected in 4 litre fractions, each fraction being made up to 70% v./v. acetone and adjusted so that with a glass electrode a pH reading of 5.8 was obtained. The fractions were assayed for antibiotic activity and measured samples were dried and weighed to determine total solids. The best fractions were combined to give 36 litres of 70% v./v. acetone with a titre of 30 units/ml. and a potency of 4.2 units per mg. of total solids. This represented 60% of the activity present in the 300 litres of broth. A further 15% was recovered in less pure and less concentrated fractions.

All liquids used were previously distilled to free them from traces of heavy metals.

*Example 2*

50 g. of carbon in a column were buffered at pH 6.0 and well washed with water, 1 litre of a fermentation broth having a titre of 6.0 units/ml. was then run down the column. After adsorption, the column was washed with 50 mls. of water and then with 50 mls. of benzyl alcohol previously saturated with water. Thereafter, water saturated with benzyl alcohol was run through to recover the active material in three fractions having respectively titres of 76.0, 60.0 and 32.0 units/ml. and potencies 3.6, 3.2, and 2.6 units/mg. of total solids.

*Example 3*

A sample of the 36 litres of 70% v./v. acetone obtained in Example 1 was flowed through a small column of activated alumina (60 to 120 mesh) previously equilibrated with water at pH 4.6. It was estimated that 5 litres of such alumina would be required to absorb all the activity from the remainder of the 36 litres. The bulk was therefore run down a column containing this amount of the same alumina. After adsorption the column was eluted with 20% v./v. acetone in water and fractions collected, the best fractions being combined and adjusted so that with the glass electrode a pH reading of 5.8 was obtained. Assay indicated that a little over 80% of the activity fed to the column was recovered in the combined fractions at a potency of 11.0 units per mg. of total solids aginst the potency of 4.2 units per mg. of total solids in the feed.

*Example 4*

The combined fractions from Example 3 (13 litres having a titre of 68 units/ml.) were adsorbed on a 1 litre colum of alumina equilibrated at pH 4.2. After adsorption of the column was eluted with N/100 sodium hydroxide and fractions collected. After combining the best fractions the acetone was removed by distillation in vacuo at less than 30° C. and the pH adjusted to 6.8. The resulting aqueous solution was shell-frozen and submitted to a vacuum of about 10 microns of mercury until dry. The resulting dry powder was found to have a potency of 22 units/mg.

Example 5

600 ml. of water were added to 500 g. of phenol and allowed to come to equilibrium at 20° C. Two layers were formed.

1 g. Cephalosporin N (potency 15 units/mg.) was shaken with a mixture of 50 ml. of each layer of solvent at 4° C. Sulphuric acid was added to the mixture until the reaction of the water-rich phase at equilibrium was pH 3.0. The lower phenol-rich layer was separated and shaken with 50 ml. of water at 4° C. and the reaction of the aqueous phase adjusted to pH 5.0 with baryta. The water-rich layer was separated and then freed from phenol by repeated extraction with benzene and freeze-dried. 450 mg. of material of potency 22 to 24 units/mg. were obtained.

Example 6

600 ml. of water, 500 g. of phenol and 66 g. of dimethyl aniline were shaken together and allowed to reach equilibrium at 20° C. in the presence of sufficient sulphuric acid to bring the reaction of the water-rich phase to pH 4.5. Two layers were allowed to form.

300 mg. of Cephalosporin N (23.4 units/mg.) were dissolved in a mixture of 2.5 ml. of each layer at 4° C. and the reaction of the water-rich phase adjusted to pH 4.5 with sulphuric acid. The subsequent procedure was similar to that used in Example 5 except that the aqueous phase was brought to pH 6.4 when back-extracting into water. Material having a potency of 27 units/mg. was isolated from the final aqueous solution. 75% of the activity in the starting material was recovered in this powder.

Example 7

600 ml. of water, 500 g. of phenol and 66 g. of 2:4:6-collidine were shaken together with sufficient sulphuric acid to bring the reaction of the aqueous phase to pH 5.5. Two layers were allowed to form. The same procedure as described in Examples 5 and 6 was used except that the extraction into the phenol-rich phase was carried out at pH 5.5, and the back-extraction into water at pH 7.0. All operations were carried out at room temperature. The potency of material, initially assaying 15 units/mg. was raised to 22 to 24 units/mg. by this procedure.

Example 8

600 ml. of water and 500 g. of phenol were shaken with sufficient sulphuric acid to bring the pH of the water-rich phase to 4.0.

2 g. of Cephalosporin N (potency 17.4 units/mg.) were dissolved in a mixture of 20 ml. of each layer at 4° C., and the pH of the water-rich phase adjusted to 4.0 at equilibrium. The system was transferred to an all glass counter-current distribution machine similar to that described by Craig and Craig (Technique of Organic Chemistry, vol. III, 171, Intersciences N.Y. 1950) and subjected to eight fundamental transfers at 4° C. The reactions of the water-rich phases were adjusted to pH 4.0 after each transfer by the addition of baryta or sulphuric acid. At the end of the distribution the phenol was removed from each fraction by adding three volumes of pure carbon tetrachloride and adjusting the reaction of the water-rich phase to pH 6.8 with baryta. A second extraction with carbon tetrachloride was then carried out. 200 mg. of material having a potency of 28 units/mg. were obtained from tube No. 5 by freeze-drying.

Example 9

A phenol-water-dimethylaniline system was prepared as described in Example 6, the reaction of the water-rich phase however being brought to pH 5.9.

1 g. of material (potency 17.4 units/mg.) was subjected to 18 transfers at room temperature in the same way as described in Example 8. After removal of the solvent, fractions 5, 6 and 7 were combined and freeze-dried. They yielded 200 mg. of material having a potency of 29 units/mg.

Example 10

1 litre of water saturated phenol, 500 ml. of phenol saturated with water, 250 ml. of carbon tetrachloride and 75 ml. of 2:4:6-collidine were shaken together. 6 ml. of 10 N-sulphuric acid were added to bring the reaction of the aqueous phase within the range pH 6.1 to 6.2.

1.3 g. of material (potency 23.7 units/mg.) were dissolved in a mixture of 30 ml. of the water-rich phase and 20 ml. of the phenol-rich phase, and subjected, in the apparatus used in Examples 8 and 9) to 24 fundamental transfers followed by 9 single withdrawals of the water-rich phase. The distribution was carried out at 20° C. and adjustments of the reaction of the water-rich phase were not necessary after the third transfer. The ratio of the volumes of the two phases was 3:2 throughout the distribution. Solvent was removed from each fraction by extraction with carbon tetrachloride as described above, but for this system the reaction of the water-rich phase was adjusted to pH 8.5 and the extraction carried out at —2° C. The aqueous solutions thus obtained after having been freed from solvents, were adjusted to pH 6.5 with sulphuric acid. The contents of tubes 10 to 14 inclusive were freeze-dried yielding 220 mg. of material having a potency of 30 units/mg.

Example 11

3.5 litre of water saturated with phenol, 400 ml. of phenol saturated with water, 400 ml. of purified carbon tetrachloride, 71 ml. of purified 2:4:6-trimethyl pyridine, 10 ml. 10 N-sulphuric acid were mixed and allowed to come to equilibrium at 3° C. Hereafter all operations were carried out at 3–4° C. The mixture separated into two layers; the lower layer contained mainly the organic solvents and the lighter layer, which had a reaction of pH 6.1 (glass electrode), was mainly water.

To 60 ml. upper phase and 40 ml. lower phase were added 4.4 g. of the barium salt of Cephalosporin N having a potency of 30 units/mg. The reaction of the aqueous phase at equilibrium was pH 6.5; this was adjusted to give an equilibrium of 6.1 by addition of 0.25 ml. of 10 N-sulphuric acid.

Tubes "0" and "1" of an all glass counter-current distribution machine were each filled with 30 ml. upper and 20 ml. lower layer. Counter-current distribution was then carried out in the normal way. The heavier organic phase was static and the aqueous phase was "mobile." Adjustments to the reaction of the aqueous phases had to be made during the first four transfers. Thereafter the reaction was constant at pH 6.1. When sulphuric acid had to be added to a fraction, in order to adjust its equilibrium reaction to pH 6.1, some barium sulphate was precipitated and this had to be removed by centrifugation.

The fundamental procedure for counter-current distribution was continued for 19 transfers. Then 77 withdrawals of upper of the aqueous phase were made, i.e., 95 transfers in all.

As each fraction was withdrawn from the machine a 0.05 ml. sample was mixed with 0.5 ml. of ninhydrin solution and heated at 100° C. for 20 minutes. The colour produced was measured against a solvent blank. In this way the distribution pattern, as revealed by the intensity of the ninhydrin colour, was obtained as the experiment proceeded. After 95 transfers most of the band identified as Cephalosporin N was out of the machine. Fractions 20 to 52 inclusive of the withdrawn series were selected for concentration and isolation of Cephalosporin N in the solid state. These fractions were pooled and the reaction adjusted to pH 7.0 with baryta; an equal volume of purified carbon tetrachloride was then added, the mixture was shaken and the carbon tetrachloride, containing most of the phenol, was drawn off after the phases had separated. The reaction of the aqueous phase was then adjusted to pH 8.3 and it was again extracted twice with an equal volume of carbon tetrachloride. This step removed the collidine. Finally the aqueous phase was acidified to pH 6.5 and the solution extracted with an equal volume of carbon tetrachloride in order to remove any phenol which was bound by the alkali at pH 8.3. The solution was then filtered to remove any barium sulphate which remained, and the residual carbon tetrachloride removed in vacuo.

Further operations were now carried out at room temperature. The solution of Cephalosporin N (700 ml.) was distilled in high vacuum using a gas bleed of purified nitrogen. When the solution had been concentrated to 70 ml. its reaction, which had risen to pH 7.2, was adjusted back to pH 6.3. It was then filtered again and freeze-dried to give an amorphous white powder.

The powder was then dissolved in 5 ml. of distilled water and 95 ml. of acetone were added. The mixture was centrifuged and the acetone supernatant discarded. The sticky precipitate was ground up under dry acetone which transformed it to a fine white powder. This was spun down and dried in vacuo. Yield 0.7 g. having a potency of 58 units/mg.

It will be appreciated that various departures may be made from the specific procedures described herein without departing from the scope of the invention.

We claim:

1. A process for the extraction of Cephalosporin N from a solution thereof which comprises adsorptively contacting said solution with charcoal at a pH above 4 but below 7, eluting adsorbed Cephalosporin N from the charcoal with a selective eluant therefor, contacting said Cephalosporin N in aqueous solution with an anion exchange resin and eluting Cephalosporin N from said resin with a dilute acid.

2. A process according to claim 1 in which the contacting and elution are carried out chromatographically at a temperature of from 0° to 4° C.

3. A process for the extraction of Cephalosporin N from a solution thereof which comprises adsorptively contacting said solution with charcoal at a pH above 4 but below 7, eluting adsorbed Cephalosporin N from the charcoal with a selective eluant therefor, and partitioning the eluted Cephalosporin N at a pH of 2.5 to 3.5 between the phases of a two phase aqueous solution of a phenolic material selected from the group consisting of phenol and the cresols.

4. A process according to claim 3 in which said partitioning is carried out at a temperature of from 3° C. to 12° C.

5. A process according to claim 3 in which said Cephalosporin N is extracted from the aqueous solution of the phenolic material at a pH above 4.5.

6. A process for the extraction of Cephalosporin N from a solution thereof which comprises adsorptively contacting said solution at a pH above about 5 but below 7 with charcoal and eluting adsorbed Cephalosporin N from the charcoal with a selective eluant therefor.

7. A process according to claim 6 in which the charcoal is eluted with aqueous acetone.

8. A process according to claim 6 in which the charcoal is eluted with a lower water miscible alcohol.

9. In a process for obtaining antibiotic substance from an antibiotic-bearing Cephalosporin N solution, the steps which comprise adsorptively contacting said solution with charcoal at a pH of about 6 to 6.5 and eluting adsorbed antibiotic from the charcoal by means of a selective eluant therefor.

10. In a process for obtaining antibiotic substance from an antibiotic-bearing Cephalosporin N solution, the steps which comprise adsorptively contacting said solution with charcoal at a pH of about 6 to 6.5, eluting adsorbed antibiotic from the charcoal by means of a selective eluant therefor, and contacting an aqueous solution of the antibiotic adsorbate with ion exchange resin from which the purified antibiotic substance is then eluted.

11. In a process for obtaining antibiotic substance of increased purity from an impure antibiotic-bearing Cephalosporin N solution, the steps which comprise contacting said impure solution with charcoal, eluting adsorbed antibiotic from the charcoal, absorbing the antibiotic by saturated aqueous phenol to which has been added about 1 to 10% of an organic tertiary base as carrier at a pH of about 4 to 5.5 and recovering the antibiotic therefrom as an aqueous solution.

12. In a process for obtaining antibiotic substance from an antibiotic-bearing Cephalosporin N solution, the steps which comprise absorbing partially purified antibiotic substance obtained from said solution in aqueous phenolic material, in which the phenolic material is selected from the group consisting of phenol and cresols, containing an organic tertiary amine base as carrier at a pH of about 4 to 5.5, removing phenolic material and base and recovering the antibiotic substance in aqueous solution.

13. In a process for obtaining antibiotic substance from an antibiotic-bearing impure Cephalosporin fermentation product, the steps which comprise adsorbing the antibiotic substance from the fermentation product with ion exchange resin and separating the adsorbed antibiotic substance from the ion exchange resin, the process being carried out at a pH above 4 and below 7.

14. In a process for obtaining antibiotic substance from an antibiotic-bearing impure Cephalosporin fermentation product, the steps which comprise extracting the antibiotic substance therefrom with a selective solvent therefor and separating the extracted antibiotic from the solvent, the process being carried out at a pH above 4 and below 7.

References Cited in the file of this patent

UNITED STATES PATENTS

| | | |
|---|---|---|
| 2,538,479 | Snyder | Jan. 16, 1951 |
| 2,560,891 | Regna | July 17, 1951 |
| 2,631,964 | Bruenings et al. | Mar. 17, 1953 |
| 2,658,018 | Gottshall et al. | Nov. 3, 1953 |
| 2,668,137 | Briggs et al. | Feb. 2, 1954 |
| 2,678,297 | McCormick et al. | May 11, 1954 |

OTHER REFERENCES

Abrahams et al.: Brit. Jour. Exptl. Path, vol. 23, No. 3, pp. 103–13 (June 1942).

Cruz-Coke et al.: Science, vol. 101, No. 2622 (p. 340) (1945).

Brook et al: J. Biol. Chem., vol. 165 (1946), pp. 463–68.

Crawford et al.: J. Gen. Microbial, vol. 6 #47–59 (1952).

Reeves: Chem. Eng., January 1952, page 145.

Nature: Vol. 176, p. 551 (1955).